United States Patent
Kurien et al.

(10) Patent No.: US 7,730,318 B2
(45) Date of Patent: *Jun. 1, 2010

(54) INTEGRATION OF HIGH-ASSURANCE FEATURES INTO AN APPLICATION THROUGH APPLICATION FACTORING

(75) Inventors: Thekkthalackal Varugis Kurien, Sammamish, WA (US); Kenneth D. Ray, Seattle, WA (US); Marcus Peinado, Bellevue, WA (US); Paul England, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 968 days.

This patent is subject to a terminal disclaimer.

(21) Appl. No.: 10/693,749

(22) Filed: Oct. 24, 2003

(65) Prior Publication Data

US 2005/0091661 A1    Apr. 28, 2005

(51) Int. Cl.
*H04L 9/32* (2006.01)

(52) U.S. Cl. .................... 713/180; 713/310; 713/189; 713/190; 713/191; 713/192; 713/193; 713/194; 713/176; 713/177; 726/9; 726/20; 726/22; 717/107; 717/108; 717/120

(58) Field of Classification Search ......... 713/189–194, 713/180, 310, 176–177; 726/9, 20, 22; 717/108, 717/107, 120, 127, 134, 143
See application file for complete search history.

(56) References Cited

U.S. PATENT DOCUMENTS

| | | | | |
|---|---|---|---|---|
| 5,859,966 A * | 1/1999 | Hayman et al. | ............... | 726/23 |
| 5,892,900 A * | 4/1999 | Ginter et al. | ............... | 726/26 |
| 6,006,332 A | 12/1999 | Rabne et al. | ............... | 713/201 |
| 6,397,242 B1 * | 5/2002 | Devine et al. | ............... | 718/1 |
| 6,490,720 B1 * | 12/2002 | Carlsen et al. | ............... | 717/127 |
| 6,496,823 B2 | 12/2002 | Blank et al. | ............... | 707/10 |
| 6,496,847 B1 * | 12/2002 | Bugnion et al. | ............... | 718/1 |
| 7,039,801 B2 * | 5/2006 | Narin | ............... | 713/152 |
| 7,043,616 B1 * | 5/2006 | McGrath | ............... | 711/163 |

(Continued)

OTHER PUBLICATIONS

Garfinkel, T. "Terra: A Virtual Machine-Based Platform for Trusted Computing", ACM SOSP. Proceedings of the ACM Symposium on Operating Systems Principles, Oct. 19-22, 2003, 193-206, XP-002340992.*

(Continued)

*Primary Examiner*—Edan Orgad
*Assistant Examiner*—Canh Le
(74) *Attorney, Agent, or Firm*—Woodcock Washburn LLP (57) ABSTRACT

Application factoring or partitioning is used to integrate secure features into a conventional application. An application's functionality is partitioned into two sets according to whether a given action does, or does not, involve the handling of sensitive data. Separate software objects (processors) are created to perform these two sets of actions. A trusted processor handles secure data and runs in a high-assurance environment. When another processor encounters secure data, that data is sent to the trusted processor. The data is wrapped in such a way that allows it to be routed to the trusted processor, and prevents the data from being deciphered by any entity other than the trusted processor. An infrastructure is provided that wraps objects, routes them to the correct processor, and allows their integrity to be attested through a chain of trust leading back to base component that is known to be trustworthy.

26 Claims, 6 Drawing Sheets

U.S. PATENT DOCUMENTS

| | | | |
|---|---|---|---|
| 7,082,507 B1* | 7/2006 | Christie et al. | 711/163 |
| 7,130,951 B1* | 10/2006 | Christie et al. | 710/261 |
| 7,130,977 B1* | 10/2006 | Christie et al. | 711/163 |
| 7,146,477 B1* | 12/2006 | Strongin et al. | 711/163 |
| 7,165,135 B1* | 1/2007 | Christie et al. | 710/269 |
| 7,228,426 B2* | 6/2007 | Sinha et al. | 713/176 |
| 7,313,687 B2* | 12/2007 | Kaler et al. | 713/152 |
| 2002/0184520 A1* | 12/2002 | Bush et al. | 713/200 |
| 2003/0041255 A1* | 2/2003 | Chen et al. | 713/193 |
| 2003/0101322 A1* | 5/2003 | Gardner | 711/163 |
| 2003/0200402 A1 | 10/2003 | Willman et al. | 711/154 |
| 2004/0064718 A1* | 4/2004 | Harrington et al. | 713/200 |
| 2004/0210764 A1* | 10/2004 | McGrath et al. | 713/200 |
| 2004/0230794 A1* | 11/2004 | England et al. | 713/164 |
| 2004/0250036 A1* | 12/2004 | Willman et al. | 711/163 |
| 2005/0033980 A1* | 2/2005 | Willman et al. | 713/200 |
| 2005/0044169 A1* | 2/2005 | Arbeitman et al. | 709/217 |

OTHER PUBLICATIONS

England, P. et al., "A Trusted Open Platform", Computer, Jul. 2003, 55-62, XP-002375734.*

Di Penta, M. et al., "Knowledge-Based Library Re-Factoring for an Open Source Project", Proceedings of the 9th Working Conference on Reserve Engineering, 2002, 319-328.*

Christian Jensen and Daniel Hagimont, "Protection Wrappers A Simple and Portable Sandbox for Untrusted Applications", ACM SIGOPS European Workshop, pp. 104-110, 1998.*

Paul England and Marcus Peinado, "Authenticated Operaton of Open Computing Devices", Springer Berlin / Heidelberg, pp. 346-361, Jan. 1, 2002.*

Tal Garfinkel and Mendel Rosenblum, "A Virtual Machine Introspection Based Architecture for Instrusion Detection", pp. 1-16, Feb. 2003.*

Tal Garfinkel, Mendel Rosenblum, and Dan Boneh, "Flexible OS Support and Application for Trusted Computing", pp. 1-6, May 18-21, 2003.*

England, P. et al., "A Trusted Open Platform", *Computer*, Jul. 2003, 55-62, XP-002375734.

Garfinkel, T., "Terra: A Virtual Machine-Based Platform for Trusted Computing", *ACM SOSP. Proceedings of the ACM Symposium on Operating Systems Principles*, Oct. 19-22, 2003, 193-206, XP-002340992.

Bugnion, E. et al., "Disco: Running Commodity Operating Systems on Scalable Multiprocessors", *Proceedings of the 16th Symposium on Operating Systems Principles (SOSP)*, Oct. 1997, 1-14.

Coffing, C.L., "An x86 Protected Mode Virtual Machine Monitor for the MIT Exokernel", *Submitted to the Department of Electrical Engineering and Computer Science, Massachusetts Institute of Technology*, May 1999, 1-109.

Di Penta, M. et al., "Knowledge-Based Library Re-Factoring for an Open Source Project", *Proceedings of the 9th Working Conference on Reverse Engineering*, 2002, 319-328.

Goldberg, R.P., "Survey of Virtual Machine Research", *Computer*, 34-45.

Popek, G.J. et al., "Formal Requirements for Virtualizable Third Generation Architectures", *Communications of the ACM*, Jul. 1974, 17(7), 412-421.

Smith, J.E., "An Overview of Virtual Machine Architectures", Oct. 27, 2001, 1-20.

Waldspurger, C.A., "Memory Resource Managament in VMware ESX Server", *Proceedings of the 5th Symposium on Operating Systems Design and Implementation*, Dec. 9-11, 2002, 15 pages.

Wavrik, J. "Code Size, Abstraction, & Factoring", *Forth Dimensions*, Jul. 1995, 25-27.

* cited by examiner

INTEGRATION OF HIGH-ASSURANCE FEATURES INTO AN APPLICATION THROUGH APPLICATION FACTORING

FIELD OF THE INVENTION

The present invention relates generally to the field of computing. More particularly, the invention provides a mechanism that supports the partitioning or factoring of applications in a manner that allows operations requiring a measure of trust or security to be integrated into ordinary, non-secure software.

BACKGROUND OF THE INVENTION

In the field of computing, there is a tension between systems that provide a high degree of security on the one hand, and systems that provide large number of functional features and a high degree of extensibility on the other hand. Security in the field of computing depends on the ability to understand and predict the behavior of a computer system (that is, the behavior of both the software and the hardware) with a high degree of certainty—i.e., the ability to ensure that the system will not, through inadvertent misuse or deliberate attack, behave in some manner other than that for which it was designed. For example, a computer system that is designed to protect copyrighted material from copying is only trustworthy to the extent that we can be assured the system will actually do what it was designed to do. Large, open architectures, however, tend to be unwieldy and complex, which makes it difficult to analyze their behavior, since there are a large number of variables that can affect that behavior. At the present time, it seems unlikely that a large complex program such as a full-service operating system or word processor could have its behavior verified to a high degree of certainty. It is possible to write a small program whose behavior can be tested and verified under a wide variety of conditions and classes of attack, but such a program would only be able to perform a limited set of functions. Thus, a tension exists between providing a large amount of functionality and providing a high degree of security.

One solution that has been proposed is to run two systems side by side—one large system that has a high degree of functionality, and another small system that has a high degree of security. Thus, a full-service operating system such as WINDOWS XP could be run along side a small, high-assurance operating system. Whenever an event occurred in the full-service operating system that needed to be performed in a tightly-controlled manner with a high-degree of trust, the task could be passed to the high-assurance operating system.

Operating systems provide environments in which other programs can execute. However, the mere fact that two operating systems can exist side by side does not address the problem of how a given application can make use of both environments. It would be desirable for an application to use the full-featured environment to perform most functions (i.e., those not requiring a high degree of security), and to use the high-assurance environment to perform functions that do require a high degree of security. Moreover, it is desirable to use these two environments in a way that provides an integrated user experience.

In view of the foregoing, there is a need for a system that overcomes the drawbacks of the prior art.

SUMMARY OF THE INVENTION

The present invention provides a mechanism whereby the functionality of an application can be factored or partitioned into multiple parts—i.e., those actions that require some degree of security or protection, and those that do not. In accordance with the invention, an application is embodied as at least two software objects: one software object that runs in a full-featured (but low-assurance) environment, and another software object that runs in a high-assurance (but limited-featured) environment. As the object in the full-featured environment executes, it may encounter data that requires some degree of protection (e.g., the data may require secrecy, or it may need to be verifiable in the sense of determining that the data has not been tampered with). When the software object that runs in the full-featured environment encounters such data, that software object causes the data to be passed to the high-assurance environment. The software object operating in the high-assurance environment then operates on the data. Any input, output, or storage of the data that is required while the data is being processed is performed using the high-assurance environment, in order to resist interception or tampering with the data by events arising outside of the high-assurance environment.

The two environments are hosted by a base component that provides the infrastructure (or "plumbing") needed for the two environments to communicate. For example, a data object that needs to be processed in a high-assurance environment may have a wrapper generated by the base component. This wrapper may identify the environment to which the data object is to be routed for processing, and may also provide a seal that enables verification of the fact that the data object has not been modified since it was wrapped by the base component. Thus, a software object can pass the data object to the base component, and the base component will be able to: (1) determine which environment the data object should be passed to, and (2) verify that the data object has not been tampered with since it was created. This latter action provides the infrastructure that allows the trustworthiness of an object to be established across platforms: If an object is created on a first machine (having a first base component), then the first base component signs the object as an attestation that the object is the exact object that was generated in a high-assurance environment known to that base component. When the object is then opened on another machine, the other machine can then verify the signature and make a decision about whether they trust the signer. (E.g., some machines and/or base components may be better at ensuring correct behavior of their hosted environments than other machines; each machine can decide for itself whether it trusts the platform on which a given data object was created.)

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The present invention provides a mechanism that allows application to be partitioned or "factored" into secure and non-secure components, and that allows these components to work together to provide an integrated user experience with respect to the application. For example, a word processing program could be partitioned into a non-secure component that performs most of the layout, editing, printing, spell-checking, grammar-checking, etc., functions that one associates with a word processor, and a secure component that enables the display and editing of data objects that need some manner of protection. The non-secure component could run in an ordinary, open environment such as a typical commercial operating system. The secure component could run in a high-assurance environment that allows certain types of software to run with a high assurance that the software will behave correctly. The invention provides various features with respect to such a scenario. First, the invention provides for an integrated user experience across the two components, so that, from the user's perspective, the user appears as much as possible to be using a single application. Second, the invention provides the infrastructure or "plumbing" that allows an application to handle both secure and non-secure data, and for such data to be used across partitions.

With respect to the user experience, it is generally the case that the user starts out using the non-secure portion of the application. Data that arises in the course of such use (e.g., sensitive text items in a word processing document, sensitive financial figures in a spreadsheet, etc.), is preferably integrated into the user experience in some way by the non-secure portion of the application, even though the data cannot actually be displayed by the non-secure portion. For example, if a sensitive or secret text item in a word processing document, the non-secure portion of the word processor may be able to display a box that represents the item, together with some type of graphic (e.g., squiggly lines indicative of text) that represent the fact that the text exists even though it cannot be displayed. In one example, the user could click on the box or graphic, and the secure portion of the application would then be invoked to display the text in the same location on the screen where the box occurs. Thus, the secure and non-secure portions of the application are integrated with respect to the user experience.

With respect to the infrastructure, the invention provides mechanisms that allow data objects in one environment to be routed to another environment. Typically, a data object that is secret or sensitive—and thus needs to be processed by the secure portion—will be encrypted so that the non-secure portion cannot read it. Thus, such an object will typically be wrapped in a series of wrappers by each component that played a part in generating the data object. Each wrapper preferably contains an identifier of the component that attached the wrapper, as well as a seal that allows the integrity of the data inside the wrapper to be verified. The outer wrapper is preferably attached by the root of trust on the machine that created the wrapper—i.e., a base component that hosts the various environments on a single machine, and that has been verified by some well known authority to be trustworthy in its behavior. This outer wrapper allows the base component to serve as a router. Thus, when the non-secure portion encounters the object, it may not be able to read the object but can identify the object as one that needs to be sent to another environment for processing. Thus, the non-secure portion sends the object to the base component, which then routes the object to the correct environment based on which environment is identified in the wrapper.

Additionally, if the object is created on a first machine and opened on a second machine, the second machine can determine the trustworthiness of the object by checking the signature that is part of the outer wrapper. It should be understood that when the base component wraps and seals an object, the base component is essentially attesting that, during the creation of the object, the base component correctly performed its functions in terms of protecting the creation process from outside tampering. (The base component typically provides the mechanisms that allow a high-assurance environment to protect itself from tampering—e.g., a trusted processor module (TPM), a memory isolation mechanism, etc.) Some base components may perform this function better than others, so any machine on which the data object is opened can make a decision about whether to trust that the object was actually created according to the security requirements that apply to that object. For example, if the object constitutes text that was entered by the keyboard, the high-assurance environment may receive input from the keyboard in a secure manner, but that environment's ability to receive keyboard input securely may depend on the base component's ability to protect the path from the keyboard to the high-assurance environment. Since the wrapper contains a seal or signature generated by a particular base component, the wrapper supports a trust model in which different machines can make decisions about how reliable a data object is based on the presumed security of the machine on which the data object was created.

The following describes systems, methods, and mechanisms that support the use of factored or partitioned applications.

Exemplary Computing Arrangement

Figure 1:
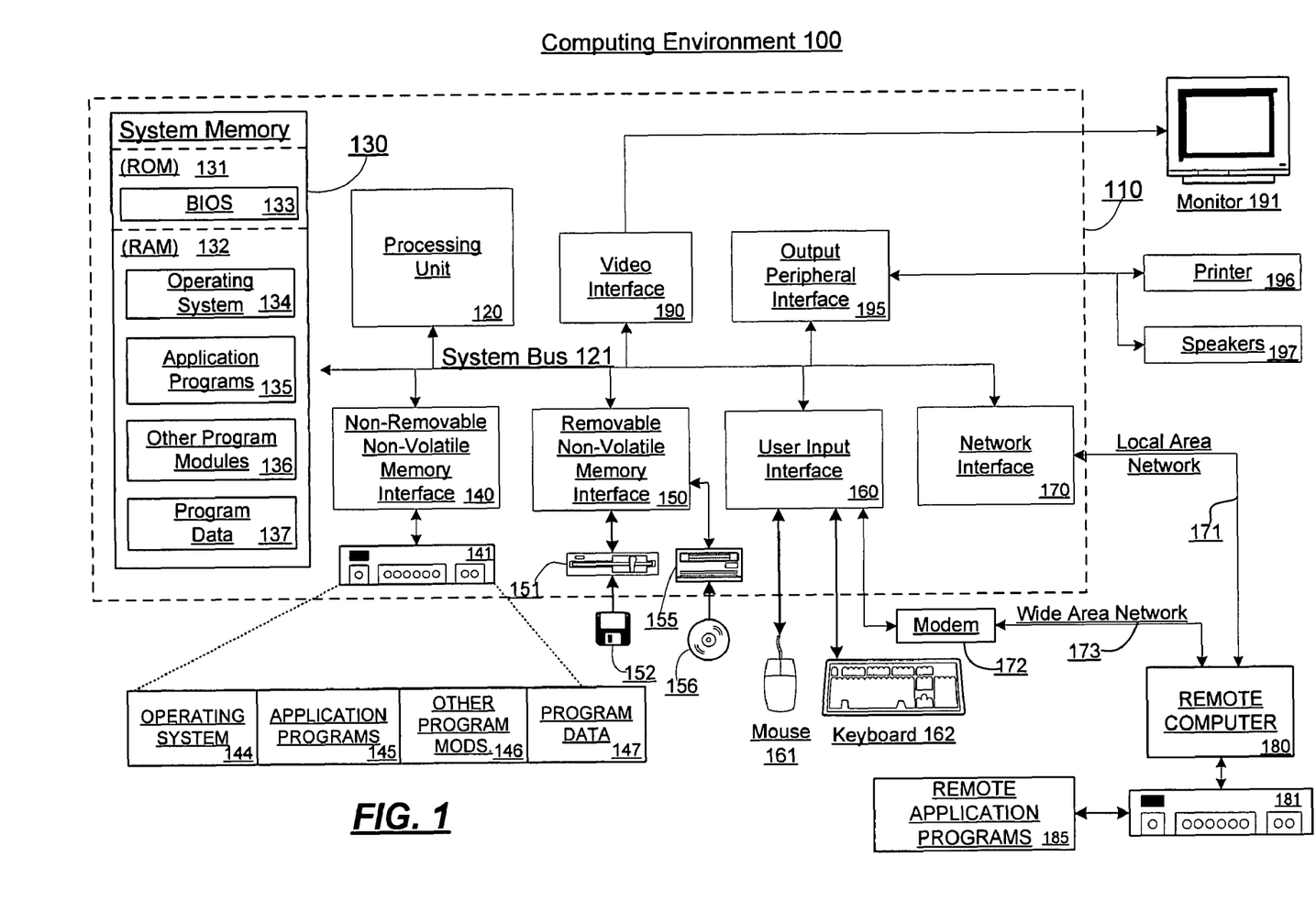
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Partitioned or "Factored" Application

Figure 2:
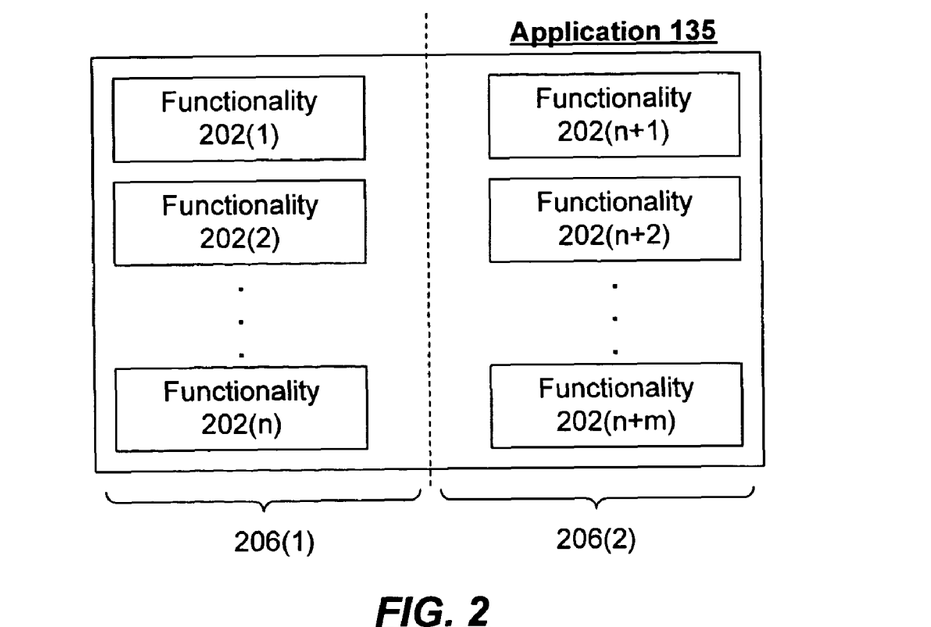
FIG. 2 is a block diagram of an application that is factored into constituent functionalities.

Software, such as an application program, typically performs various different functions and operates on various different types of data. In this sense, an application can be viewed as a collection of different functionalities. It may be useful to break an application down into its various different functionalities, so that these different functionalities can be performed separately (e.g., assigned to environments providing different levels of security). FIG. 2 shows how an application can be broken down into its various different functionalities.

Application 135 comprises various different functionalities 202(1), 202(2), . . . , 202(n), 202(n+1), 202(n+2), . . . , 202(n+m). For example, application 135 may be a word processing program, and the separate functionalities may be editing, viewing, printing, tracking changes, etc. It should be noted that, while FIG. 2 shows application 135 as having n+m discrete functionalities, there is some discretion in deciding what is a discrete functionality. For example, all printing operations may be viewed as a single functionality, or else printing may be viewed as comprising two or more different functionalities (e.g., printing a page versus printing the entire document). Additionally, as further discussed below, the same basic operation may be viewed as multiple functionalities depending upon what type of data is being operated upon. (E.g., the basic operation of viewing a document may be considered to be one of two different functionalities, depending upon whether the data being viewed is secure or non-secure. Thus, there could be two separate viewing functionalities, one that is secure in some respect, and one that is not. Essentially, breaking down a program into its constituent functionalities is a matter of drawing boundaries around the various things that the program does (and/or the various different types of data on which the program operates), and, in general, there is no particular requirement as to how these boundaries are drawn.

In one example, functionalities may be grouped together such that functionalities 202(1) through 202(n) are part of a first "partition" 206(1), and functionalities 202(n+1) through 202(n+m) are part of a second partition 206(2). It may be convenient to group functionalities in this manner, so that functionalities in the same partition can be treated similarly. For example, partition 206(1) may include the functionalities of application 135 that involve ordinary, non-secure data, while partition 206(2) may include the functionalities of application 135 that involve secret or secure data (or data that otherwise requires some level of protection). Thus, functionalities in partition 206(1) can be performed in an ordinary open environment (e.g., the environment provided by an ordinary commercial operating system), while the functionalities in partition 206(2) can be run in a high-assurance environment. (High assurance environments are more particularly discussed below.)

Figure 3:
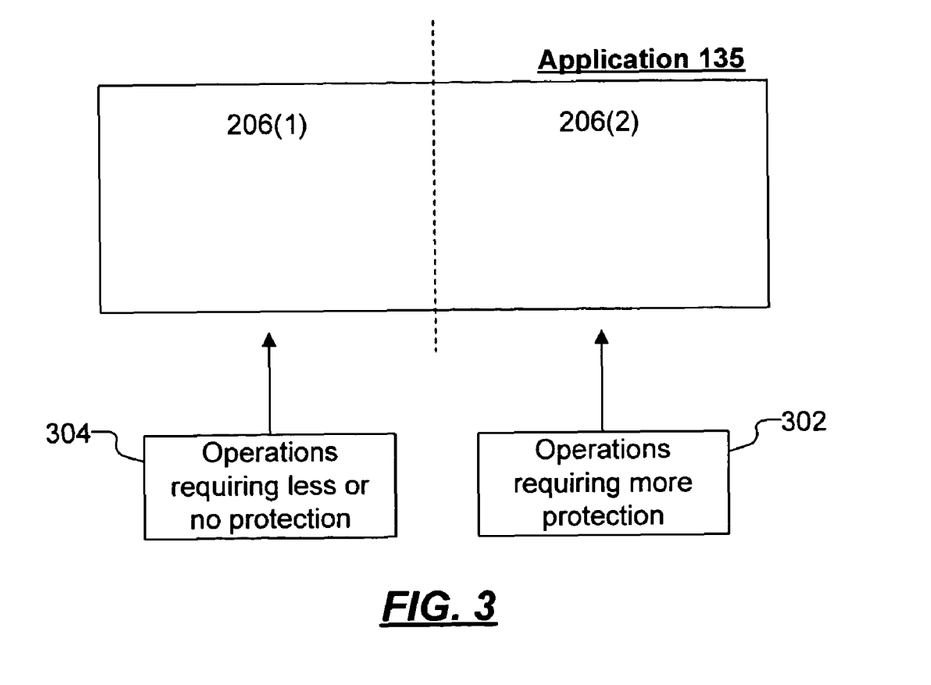
FIG. 3 is a block diagram showing the routing of data to different components of an application.

FIG. 3 shows an example of how partitions can be used to allow a single application 135 to handle both secure and non-secure data. In the example of FIG. 3, application 135 performs operations 302 that require a high degree of protection (e.g., operations involving secret data), and also performs operations 304 that require a lower-degree of protection or no protections (e.g., operations that do not involve secret data). ("Operations" on data, in this example, can include any type of handling of data, such as performing input or output of the data, performing a calculation on the data, etc.) In this example, the functionality that does not involve operating on secret data is handled by partition 206(1) of application 135, and the functionality that involves operating on secret data (or data that other requires some type of protection) is handled by partition 206(2). For example, if application 135 is a word processing program, then displaying an ordinary (non-protected) document may be performed by partition 206(1), and displaying a secret document may be performed by partition 206(2). As another example, if application 135 is a stock-trading program, partition 206(1) may contain functionality that allows a user to look up the current price of a stock, while partition 206(2) may allow the user to buy and sell shares of the stock after authenticating the user (in this case, the user's authentication credentials, and the details of his or her financial accounts, are a type of secret data).

It should be understood that FIG. 3 demonstrates that different partitions of an application can be used to handle secret and non-secret data, but that FIG. 3 is not limited to any particular mechanism for implementing or using a partitioned application. An example architecture is discussed below in connection with FIGS. 4-8 that supports the partitioning of an application, and the use of the partitions in a way that provides an integrated user experience.

Example Partitioned Application

Figure 4:
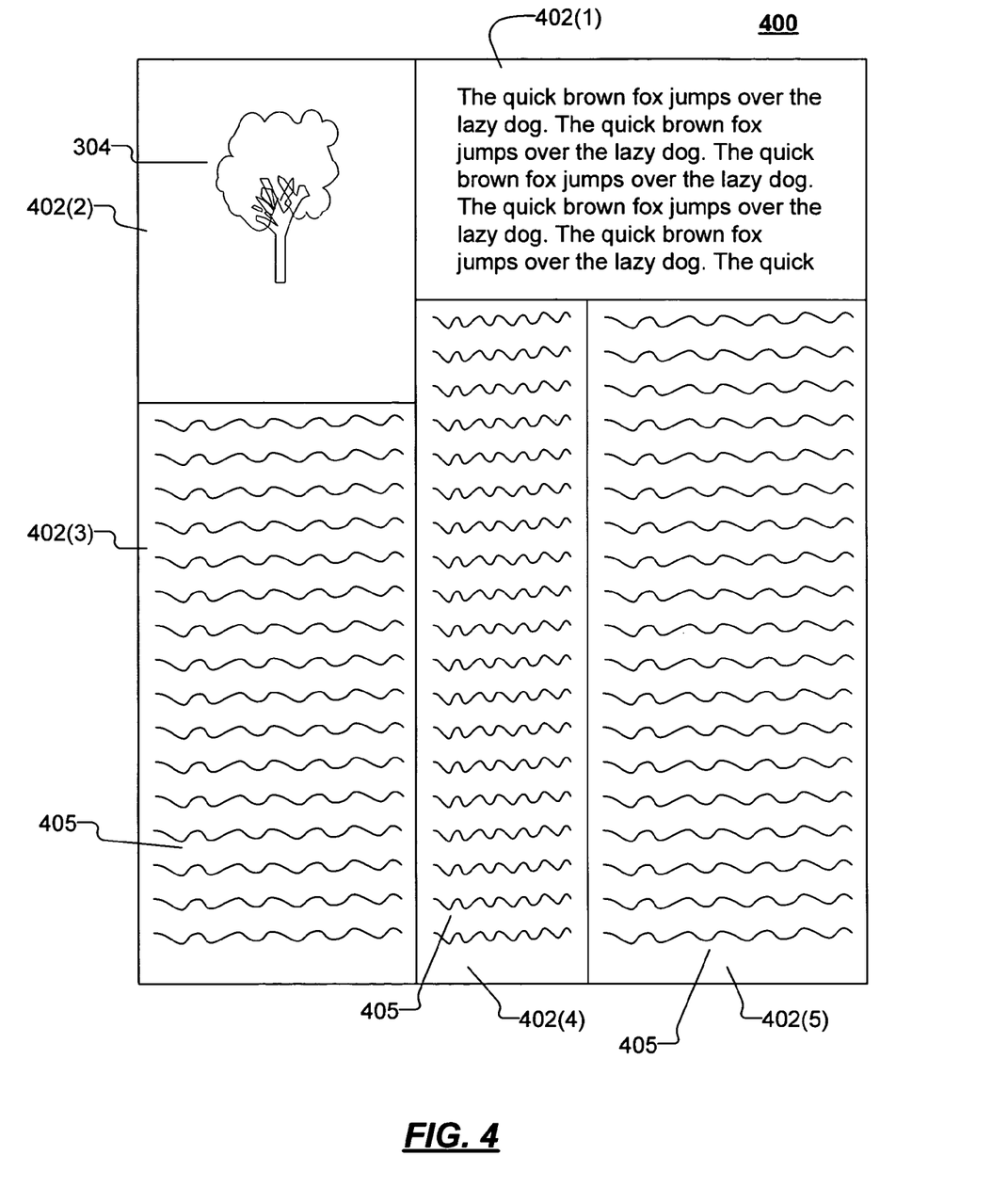
FIG. 4 is a block diagram of an example of a user interface for a factorable application.

As discussed above, the various functionalities of an application may be partitioned according to any criteria. In the example of FIG. 3, the functionality of an application is partitioned according to whether the application is handling secure or non-secure data. When an application is partitioned, it is desirable to integrate the various partitions into a single user experience. FIG. 4 shows an example user interface for a partitioned application. (It should be understood that "secure" data refers to data that requires some type of protection, although the invention is not limited to any particular type of protection. For example, the data may require protection in the sense of "secrecy," in which case the data may be encrypted. As another example, the data may require protection in the sense of being verifiable—i.e., the ability to determine that the data has not been modified since some reference point in time—in which case the data may be signed.)

User interface 400 is an interface for a word processing program. (It should be understood that a word processing program is a convenient example of an application, although it is by no means the only example.) In the example of FIG. 4, user interface 400 displays various items 402(1) through 402(5) that are part of a word processing document. Item 402(1) is ordinary non-secure text. Item 402(2) is a non-secure graphic 404. Items 402(3), 402(4), and 402(5) are items of secure text. The non-secure partition of the application performs all processing that does not involve the handling of secure data. In this example, this processing includes the display (and possible editing, printing, saving, etc.) of non-secure items 402(1) and 402(2), as well as the layout of all items (even secure items). The non-secure partition is able to lay out secure items because it is presumed that, while the content of items 402(3), 402(4), and 402(5) may be secret, the existence of these items is not secret. Thus, the non-secure partition is capable of displaying items 402(3) through 402(5) as indecipherable squiggles 405, thereby providing the user with at least some user experience with respect to content that the non-secure partition is not able to process.

If the user wishes to view content items 402(3), 402(4), and 402(5), the user may, for example, click on the squiggles 405 that represent a given content item. This action may cause the secure partition to be invoked. The content contained in one of the secure items can then be passed to the secure partition for handling. In one example, the secure partition may then display the actual content item in a window that is superimposed over the place for the content that was laid out by the non-secure partition—e.g., when the secure partition displays content item 402(3), it may do so by placing an image of that content item on top of the region where the squiggles 405 that represent content item 402(3) had been previously shown. Although the above-described scenario involves the user's interacting with two different pieces of software (i.e., the secure and non-secure partitions), it may appear to the user that he is interacting with a single application, thereby providing an integrated user experience across the two partitions.

FIG. 4 shows an example in which the partitioned application is a word processing program. Other examples include:

A spread sheet, where the user can enter formulas and build tables, etc., in the non-secure partition but where the actual data to be operated on is available only to the secure partition. Thus, the non-secure partition displays some placeholder data (e.g., "xxxx") in each cell. Evaluation and rendering of the data in the cells is performed by the secure partition of the application. When the user pushes the "calculate" button, a window (generated by the secure partition) pops up and displays the cell values in the appropriate rows and columns, which are calculated based on the underlying data that is available to the secure partition. In this implementation, the secure partition will have an evaluation engine and a (trivial) rendering routine, but will not need to incorporate other aspects of the spreadsheet's user interface, help windows, formula builders, etc.

A securities trading application, where functions are assigned to the secure and non-secure partitions accordingly. For example, displaying trading graphs and stock information (which is publicly available) can be performed by the non-secure partition. The secure partition, on the other hand, allows the user to enter the stock trading symbol, the price and number of shares to be bought or sold by the user, and sends this information to a remote trading server, after first verifying the identity of the server.

A word processor that outputs a document in an image format (e.g., Portable Document Format, or "PDF"). The secure partition is capable of reading and displaying the image. This rendering of the document is called the "facsimile" of the document. The underlying word processing document (i.e., the version of the document that contains formatting codes and text characters, instead of just an image) and its facsimile are sent by the non-secure partition to the secure partition, and the secure partition displays the facsimile. The user signs the facsimile (or a digest of the document and the facsimile) using a secure signing agent in a secure environment. The signed facsimile (called "facsimile-0") and the underlying document are returned in a blob to the non-secure partition. When a verifier receives the blob containing the document, facsimile-0 and the signature of the facsimile, the verifier first renders a new copy of the facsimile (called facsimile-1) based on the underlying word processing document. The verifier transmits, facsimile-0, facsimile-1, the Word document and the signature over to the secure partition, which verifies that the facsimiles are identical, and that the signature over facsimile-0 is valid. While this model does not provide for secrecy of the document (since facsimile-1 of the document can still be rendered by the non-secure partition), it does serve to verify the integrity of the document—i.e., the fact that the document is the one that was originally created, and has not been modified.

Figure 5:
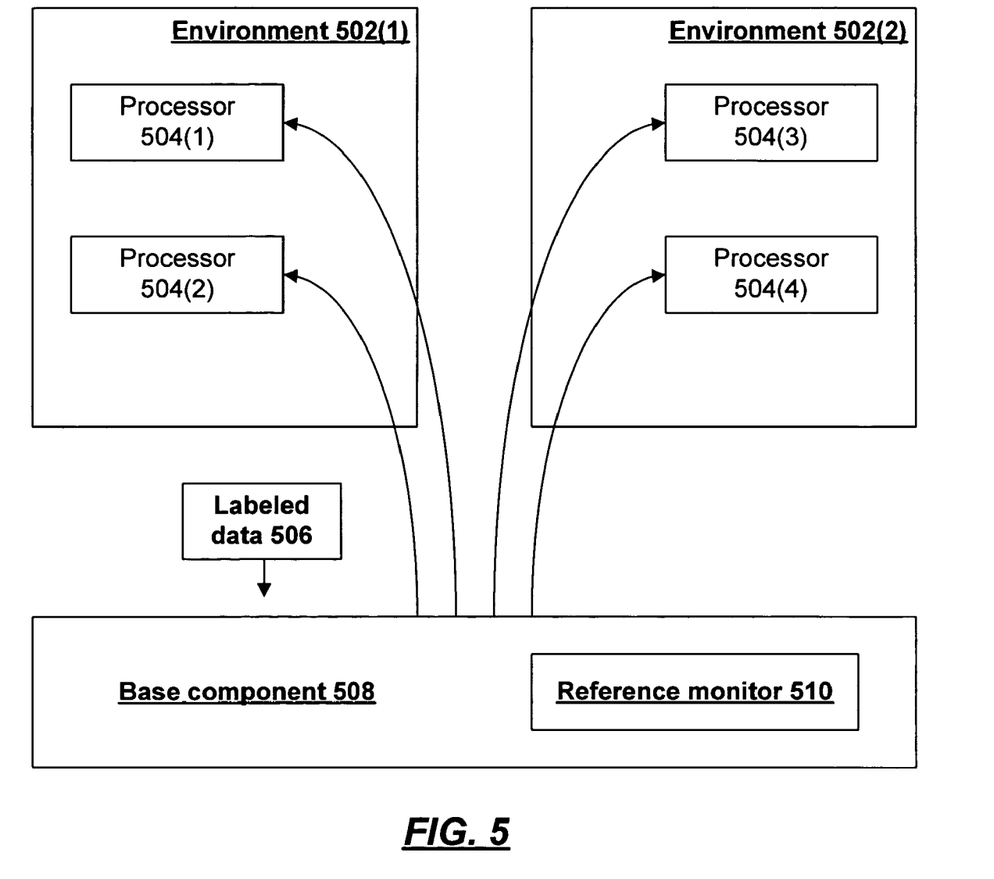
FIG. 5 is a block diagram of an example architecture that supports the use of factored applications.

FIG. 5 shows an architecture that supports the partitioning of an application. In FIG. 5, there are two environments 502(1) and 502(2) in which software can run. In this example, there are four separate processors 504(1), 504(2), 504(3), and 504(4). In this context, "processor" refers not to a microprocessor, but rather to a software component that in some way processes data for the application. Processors 504(1) and 504(2) run in environment 502(1), and processors 504(3) and 504(4) run in environment 502(2). For example, processors 504(1) and 504(3) may be the non-secure and secure portions, respectively, of a single word processing application. A base component 508 hosts the environments 502(1) and 502(2), so that the two environments can co-exist on a single machine. The invention is not limited to any particular type of base component 508; some examples of base component 508 are a virtual machine monitor (VMM), an exokernel, a microkernel, or a hypervisor. For example, environments 502(1) and 502(2) may be separate operating systems hosted by a VMM or a hypervisor. As another example, base component 508 could be one of the operating systems—e.g., a high-assurance operating system that provides some user functionality, and also enforces the separation between itself and the other (low-assurance) operating system.

One component that runs as part of base component 508 is a reference monitor 510. Reference monitor 510 performs the function of routing a given data object to the correct environment for processing. For example, labeled data 506 may be encountered (or generated, or inputted) during the running of an application, and reference monitor 510 causes labeled data 506 to be routed to the correct environment. Labeled data 506 is associated with an identifying tag that allows reference monitor 510 to determine which environment the labeled data should be routed to. Additionally, labeled data 506 may also contain additional tags that allow the destination environment to determine which processor the data should be given to for processing. An example structure of labeled data 506 is discussed below in connection with FIG. 7.

Labeled data 506 may be encountered (or generated, or inputted) in any location, although most typically labeled data will be encountered in one environment and will be passed to another environment. For example, the non-secure portion of a word processing application may encounter labeled data that contains some secret text. The word processing application can then display a representation of the text in the manner shown in FIG. 4 (e.g., as indecipherable squiggles). Should the user desire to display the actual text (e.g., by clicking the area reserved for the data), the non-secure partition of the application (e.g., processor 504(1) running in environment 502(1)) can provide the labeled data 506 to reference monitor 510, which will then provide the data to environment 502(2). Environment 502(2) can then route the data to the correct processor (e.g., processor 504(3)), which can then display the data in the appropriate location on the screen in the manner described above in connection with FIG. 4.

It should be understood that, within the model of FIG. 5, applications are essentially made of processors—i.e., components that can handle different specified types of data or perform certain categories of tasks—and different partitions of an application use different processors. For example, processors 504(1) and 504(3) may represent the secure and non-secure processors of a single application (e.g., a word processing application), where the data is routed to either one of processors 504(1) or 504(3) depending on whether the data is secure or non-secure data.

It should also be understood that there is no requirement as to what types of environments are available, but it may be particularly useful for one environment to be a high assurance operating system, and for the other environment to be an ordinary, full-service open operating system. A "high assurance" operating system is one that provides a relatively high level of assurance that it will perform its expected functions correctly. Given that all software (including an operating system) is associated with a specification that describes the expected function of the software, and given that all software is subject to some level of bugs or attacks that cause the software to behave in an unexpected manner, a "high-assurance" operating system is one that provides a relatively high level of trust that the operating system will behave according to its specification. (Most commercial software comes with an explicit, written specification, although a specification in this context can also constitute an implicit, unwritten understanding as to how the software should behave.) High assurance is not the same thing as security, although high assurance can be used to achieve security. For example, a processor for secret data can be designed to run in the high-assurance operating system; to the extent that the processor's ability to protect secret data depends on the correct behavior of the environment in which it runs (e.g., the correct execution of system calls, correct process isolation, etc.), the processor can provide a level of security that might not be achievable if the processor were to run in an ordinary, full-service operating system. (The trade-off for high assurance is that a high assurance environment may have a very limited scope of functionality; the larger a program is, the more difficult it is to verify that the program will behave correctly in a wide variety of circumstances. Thus, a full-service commercial operating system such as WINDOWS XP would typically not be considered high assurance.)

In the context of the above description of high-assurance, it can be appreciated that it is often useful to partition an application into a low-security processor that handles data that does not require significant security, and a high-security processor that handles data requiring more security. The high security processor can run in a high-assurance environment, and the low-security processor can run in a low-assurance environment.

Example Architecture to Support a Partitioned Application

Figure 6:
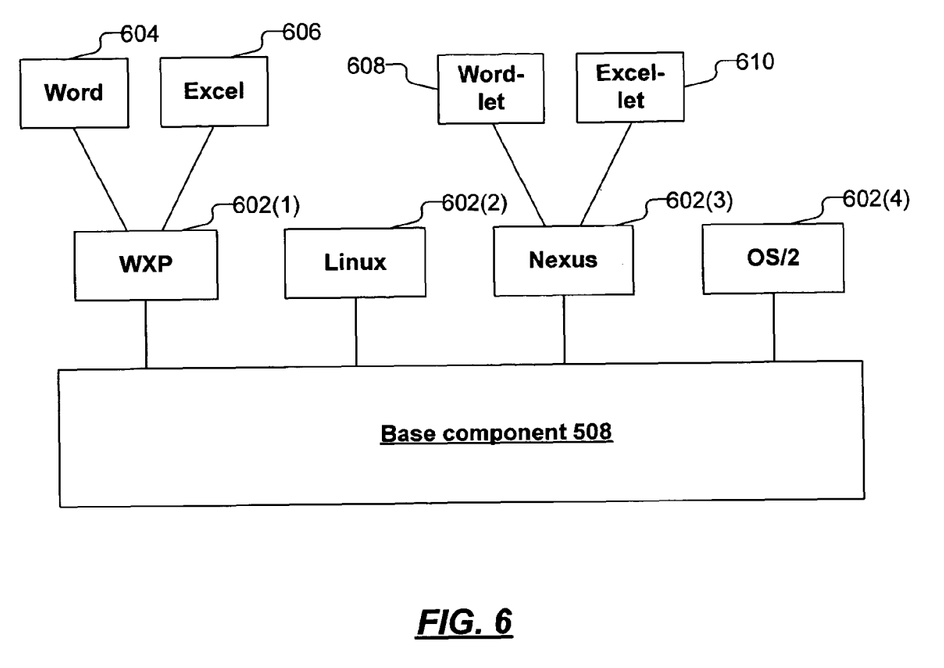
FIG. 6 is a block diagram of an example hierarchy of environments in which a factored application may be used.

FIG. 6 shows an example architecture 600 in which a partitioned application can execute. Architecture 600 includes a base component 508, whose function is to host the various environments in which partitions of an application will execute. Base component 508, as noted above, can take various forms, such as a VMM, an exokernel, a microkernel, a hypervisor, etc. Base component 508 has the functionality to host plural environments (e.g., operating systems), and also manages (and limits) the interaction between these environments. The hosting of plural environments can be performed using various techniques. For example, base component 508 may expose, to each of a plurality of operating systems, a self-contained "virtual machine"; the operating systems then control the virtual machine "virtual hardware," and the base component 508 issues instructions to the "real" hardware that are based on (but not necessarily identical to) the instructions that the operating systems have given to the virtual machines. (Generally speaking, this is how a traditional VMM works.) As another example, base component 508 may assign certain devices and certain segments of the machine's physical address space to the different operating systems, and may enforce the assignment by permitted each operating system to control only its assigned devices and its assigned portion of the address space. The invention is not limited to any particular embodiment of a base component; it is merely assumed, for the purpose of FIG. 6, that there is a base component that is capable of hosting plural environments so that these plural environments can co-exist on a single machine in some degree of isolation to one another.

In the example of FIG. 6, base component 508 hosts operating systems 602(1) through 602(4). Operating system 602(1) is an instance of the WiNDOWS XP operating system, or another general-purpose operating system; operating system 602(2) is an instance of the Linux operating system; operating system 603(3) is a "nexus"—i.e., a high-assurance operating system (within the meaning described above), which may provide limited functionality but a high-assurance that this functionality will be carried out correctly; operating system 602(4) may be another general-purpose operating system, such as OS/2. In general, base component 508 can host an arbitrary number of operating systems (or other types of environments), and the four operating systems shown in FIG. 6 are merely an example.

Within a given operating system, it is possible to run a piece of application-level software. For example, the MICROSOFT WORD word processing program (604) and the MICROSOFT EXCEL spreadsheet program (606) run under the WINDOWS XP operating system 602(1). The Linux operating system 602(2), nexus 602(3), and the OS/2 operating system 602(4) may also run their own application programs. In this example, programs called "Word-let" (608) and "Excel-let" (610) run under nexus 602(3). Word-let 608 is the secure program that works with WORD 604 when WORD needs to handle secure data. Similarly, Excel-let 610 handles secure data for EXCEL 606. Thus, in the example of FIG. 4, WORD 604 may be the program (or "processor") that handles non-secure data items, lays out data items within a window, and displays the indecipherable squiggles that represent secure items. Word-let 608 may be the program that opens a secure item and renders the item in the region of the window that WORD 604 reserves for the item. Essentially, WORD 604 and Word-let 608 together represent a partition (or "factoring") of the functionality of a word processing application across different processors that execute in different environments. Similarly, EXCEL 606 and Excel-let 610 may have a similar relationship—i.e., EXCEL 606 handles most spreadsheet functions that do not involve secure data, and Excel-let 610 handles secure data on behalf of EXCEL.

As discussed above, nexus 602(3) is a high-assurance operating system that can provide an environment in which a trusted application (i.e., an application whose behavior is sufficiently certain that it can be trusted with sensitive operations such as opening secret data) can execute. However, nexus 602(3) is likely to provide very limited functionality. Thus, it is useful to partition a word processing application, for example, into WORD 604 and Word-let 608 so that WORD can use the extensive features available in a general-purpose operating system to provide broad functionality, and Word-let can use the high-assurance nature of the environment provided by nexus 602(3) to perform a (probably limited) set of sensitive functions with a high degree of trustworthiness.

FIG. 6 shows a base component that provides the infrastructure to support the partitioning of applications. The following is a description of some of the features that the infrastructure may include:

Registration and directory service: The base component may provide an interface by which environments hosted by the base component can register with the base component. The base component may also provide methods by which hosted environments can be started (or the base component may be one of the hosted environments). The assurance level of an environment is meta-information associated with the environment, and the base component may provide an optional service to access and lookup this information in a structured way.

Separation: Hosted environments have a security context assigned to them by the base component. The security context of an environment may contain such components as:

a. DAC context e.g., the code-id of an environment.

b. MAC context: In case of MAC, the MAC context of an environment consists of a sensitivity label and a category.

Communication: Inter-environment communication is regulated by the base component by using uni-directional transports owned by the base component.

a. Transports provide in-sequence and reliable message delivery between environments. A synchronization object is provided for notifying an environment of arrival of data on a transport.

b. Access Control: Transports are objects owned by the base component, and the ability of a hosted environment to read from or write onto a transport is regulated by the access control model enforced by the base component. In case of DAC, this is controlled by an ACL on the transport for the actions "read" and "write". In the case of MAC, this is controlled by the label attached to the transport. In order to provide for export to multi-level devices, the base component provides implementations of front-end security filters. Front-end security filters (FESF) are functions registered to the base component that can be attached to the write or read ends of transports. In case of a write(read)-FESF, the write FESF is called by the VMM before data is written (read) to (from) the transport by a VM. An example of a write-FESF is Seal( ) that is typically applied to data in a high-assurance environment before that data is written to an ordinary (non-high-assurance) environment if MAC is in force. If MAC is not in force, an environment will have to encrypt data that it considers privacy sensitive before sending it to another environment.

Messages: Transports carry messages across different environments. A message is a data blob created by the base component that is structured as follows:

a. Security context assigned by the base component: Contains a DAC and MAC context. The DAC context contains the subject-id of the creating environment. The MAC context contains the sensitivity label and category of the creating environment.

b. Content: Data (including security context assigned by a creating environment).

Higher level abstractions: Environments (or applications or other software objects running in an environment) may implement an RPC interface by themselves by using the communications abstraction exposed by the base component. This may be a service provided by an environment, or simply library code. Another abstraction that may be exposed is a socket call interface between environments, which need not be implemented by the base component.

Focus management: In many of the examples of partitioned applications, arrival of a message from one environment to the other may cause a change in the current owner of the secure input or output device. Focus management is provided by the base component on request by environments—e.g., an environment may request a change in focus upon arrival of a message from another environment. An environment then has a session with the secure input/output device and then relinquishes control. The base component can force termination of an I/O session by an environment.

Example Data Object for Use with Partitioned Applications

Figure 7:
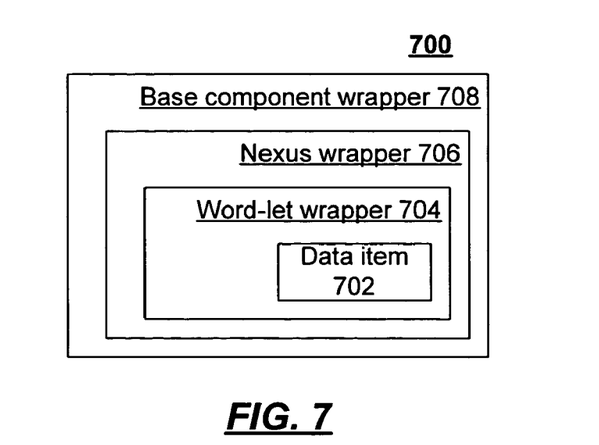
FIG. 7 is a block diagram of an example data object for use in an environment that supports the use of a factored application.

FIG. 7 shows an example structure of a data object, that allows the data object to be used with partitioned applications. As described above, when an application is partitioned, a first partition of the application may encounter a data object that cannot be processed by that partition but needs to be sent to a second partition. In the case where the first partition is the "non-secure" part of the application and the second partition is the "secure" part, it is preferably that the first partition can recognize that the data object needs to be sent elsewhere for processing, even if the first partition cannot determine anything else about the object (e.g., even if the first partition cannot read the object's contents). Additionally, in some circumstances it may be important to verify that the data object was, in fact, created under secure circumstances and has not been modified since (e.g., it should be possible to determine whether the data was entered in an environment in which data on its way from the keyboard to the I/O stream of an application is protected from spoofing). Thus, it is also preferable that the data object be represented in a manner that allows its chain of handling to be verified.

Data object 700 includes a data item 702. Data item 702 is the underlying substantive content that data object 700 exists for the purpose of carrying—e.g., a secret word processing document (or portion thereof), sensitive financial data for a spreadsheet, password information to authenticate a user in a financial transaction, etc.

Data item 702 is wrapped in a series of wrappers by each layer of the architecture that handles the data. Each wrapper serves two purposes: (1) the wrapper identifies the entity (e.g., an application, an environment, etc.) that placed the wrapper on the item, which assists in later routing the item to that entity; (2) the wrapper seals the item in a manner that later allows one to verify that the item has not been modified since it was wrapped. For example, if Word-let 608 creates data item 702, then Word-let can attach both a digital signature of data item 702, as well as a header that identifies Word-let as the processor to which data item 702 should later be routed when it needs to be handled in some manner. The signature and header thus constitute a wrapper 704. It should be noted that wrappers are not limited to signatures and headers, or to any particular embodiment, and there are various known techniques that allow an item to be identified, and that allow the item's integrity (i.e., non-modification) to be verified.

As described above, security of a processor such as Word-let is based on a hierarchy of trusted components—i.e., Word-let is trustworthy because it relies on the high-assurance of the nexus; the nexus is trustworthy because it relies on the isolation capabilities of the base component, etc. Thus, each component in the hierarchy that is in the chain leading up to the application that creates data item 702 wraps the item in its own wrapper. The data item 702, which is already wrapped by Word-let's wrapper, is then wrapped by the nexus's wrapper 706. This (doubly-wrapped) item is then wrapped by the base component's wrapper 708. Each wrapper essentially identifies the wrapping component and also constitutes a verifiable assertion (to the extent that the wrapping component is trustworthy) that the wrapped contents have not been changed since they were wrapped.

Additionally, since the wrappers are nested according to the order of the hierarchy, each wrapper is useful for routing purposes. Thus, when data object 700 is encountered by an application, the outer wrapper 708 identifies the object as one that needs to be routed to another processor, so the object is sent to the base component. The base component then uses the wrapper to verify the integrity of the contents inside the wrapper, and uses the next-level wrapper 706 to determine which environment the contents needs to be routed to (in this case, to the nexus). The nexus then verifies the integrity of the contents inside wrapper 706, and also uses wrapper 704 to determine which software object (in this case, Word-let) will handle contents. Word-let then verifies the integrity of the contents inside wrapper 704. This contents is data item 702. Thus, the structure of data object 700 allows data item 702 to be routed and verified at each step in the chain leading up to the processor that will handle data item 702.

Example Process of Using Partitioned Application

Figure 8:
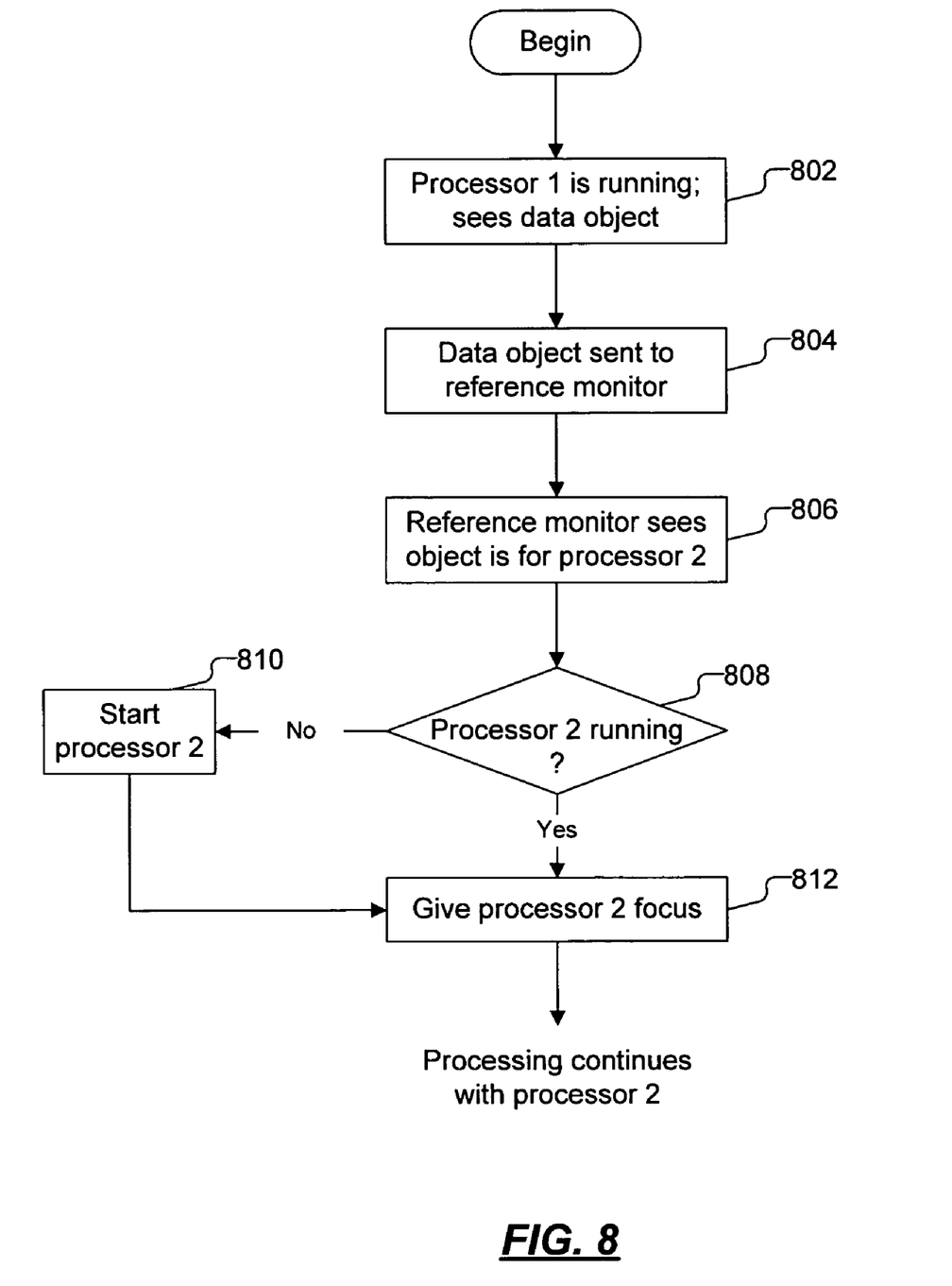
FIG. 8 is a flow diagram of an example process by which data may be processed in a factored application.

FIG. 8 shows an example process by which a partitioned application is used. It is assumed, for the purpose of the example of FIG. 8, that an application has two processors, referred to as processor 1 and processor 2.

Initially, processor 1 is running; during the time the processor 1 is running, processor 1 encounters a data object (802). As discussed above, processor 1 may not be able to read the data object, but may be able to recognize the data object as something that needs to be sent elsewhere for processing. Thus, processor 1 sends the data object to the reference monitor (804).

The reference monitor uses the outer-most wrapper of the data object to determine where the data object needs to be sent. As discussed above, the reference monitor (which is preferably part of the above-discussed base component) also uses the outer-most wrapper to verify the integrity of that wrapper's contents. In this example, it is assumed that that the integrity of the contents has been maintained, and that the reference monitor determines that the data object needs to be processed by processor 2 (806). (As discussed above, the reference monitor may not be directly aware of processor 2's existence, but rather may use the wrapper to route the object to a particular environment, where the object is subsequently routed to processor 2 by the receiving environment. Since the use of nested wrappers in this manner is discussed above in connection with FIG. 7, for the sake of simplicity the example of FIG. 8 merely assumes that the data object can be routed to processor 2 in some manner without regard to the intermediate routing steps that may be involved in routing the object to processor 2.)

When the determination has been made that the data object is destined for processor 2, it is determined (808) whether processor 2 is running. For example, this determination may be made by the environment in which processor 2 is intended to run (e.g., the nexus, in prior examples). If processor 2 is not running, then processor 2 is started (810). After processor 2 has been started (or otherwise determined to have been already running), then processor 2 is given focus (i.e., the ability to perform I/O on input and output devices) if processor 2 is to handle any input or output.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system that manages the partitioning of an application comprising:

at least one processor and at least one memory in communication with said at least one processor, said processor configured to execute program instructions that comprise the following:

a base component stored in said at least one memory that hosts an operation of a first environment and a second environment, the application comprising:

a first software object of said application that executes in said first environment comprising a first operating system, wherein said first software object provides a subset of the operations of the application; said first software object handling a plurality of data and including logic to identify a first of said plurality of data as not processable by said first software object, said first software object sending said first of said plurality of data to said base component, said first software object receiving processed data corresponding to said first of said plurality of data from said base component, said first software object using said processed data to further process the plurality of data; and a second software object of said application that executes in said second environment comprising a second operating system, said second software object receiving said first of said plurality of data from said base component with a corresponding wrapper, said second software object verifying said first of said plurality of data as being unmodified by comparing said data to the corresponding wrapper, said second software object processing said first of said plurality of data in a manner that resists tampering with said first of said plurality of data, said second software object sending said processed data to said base component;

said base component comprising or hosting logic that receives said first of said plurality of data from said first software object, applies the corresponding wrapper to said first of said plurality of data, said corresponding wrapper comprising an indication of said second environment of said second software object and a seal that may be checked against said first of said plurality of data to determine whether said first of said plurality of data has been altered since the seal was determined, and routes said first of said plurality of data to said second environment, such that functionality of said application is parsed between said first and second operating systems;

said base component further comprising or hosting logic that receives said processed data from said second software object, applies a second wrapper to said processed data, said second wrapper comprising an indication of said first environment of said first software object and a second seal that may be checked against said processed data to determine whether said processed data has been altered since the second seal was determined, and routes said processed data to said first environment, such that functionality of said application is parsed between said first and second operating systems.

2. The system of claim 1, wherein said first software object causes a representation of said first of said plurality of data to be displayed on a display device, said representation comprising one or more indecipherable graphics.

3. The system of claim 2, wherein said one or more indecipherable graphics are either: the same size as each other, or of sizes that are unrelated to a content of said first of said plurality of data.

4. The system of claim 1, and wherein a resistance to tampering provided by said second software object comprises said second environment resisting interference with a display of said first of said plurality of data by writing a representation of said first of said plurality of data into a video memory associated with a display device so as to cause said representation to supersede any image at a location on said display device at which said representation is to be displayed.

5. The system of claim 1, wherein said first of said plurality of said is entered on a keyboard, and wherein the resistance to tampering provided by said second software object comprises resisting tampering with said first of said plurality of data in transit from said keyboard to an input stream of said second software object.

6. The system of claim 5, wherein said second software object wraps said first of said plurality of data to prevent subsequent tampering with said first of said plurality of data.

7. The system of claim 6, wherein said second environment wraps said first of said plurality of data with a wrapper and the wrapper is an indication that said first of said plurality of data and said signature were created in said second environment.

8. The system of claim 1, wherein said base component comprises a component that assigns a first identifier to said second environment.

9. The system of claim 8, wherein said first of said plurality of data includes, or is accompanied by, said first identifier and a second identifier that identifies said second software object.

10. The system of claim 1, wherein said first environment is associated with a first specification that describes a behavior of said first environment, wherein said second environment is associated with a second specification that describes the behavior of said second environment, wherein there is a higher level of assurance that said second environment will conform to said second specification than that said first environment will conform to said first specification.

11. The system of claim 10, wherein said second software object relies upon the behavior of the second environment in order to resist tampering with said first of said plurality of data.

12. The system of claim 1, wherein said base component is said second environment, or is included within said second environment.

13. A method of a first software object of an application, which executes in a first environment comprising a first operating system executing on a computer, handling data to which an assurance policy that corresponds to a level of assurance that the application will perform its expected functions correctly applies, the method comprising:
  determining, by the first software object executing on the computer, that the data should be processed securely;
  sending, by the first software object, the data to a base environment with an indication to process the data securely;
  determining, by the base environment, a second software object with which to process the data securely, the second software object corresponding to the first software object;
  applying, by the base environment, a wrapper to the data, the wrapper identifying a second software environment of the second software object, the wrapper comprising a seal that may be checked against the data to determine whether the data has been altered since the seal was determined;
  sending, by the base environment, the data and the corresponding wrapper to the second software environment;
  creating, by the second software environment, a resistance to tampering comprising determining that the data has not been modified using the data and the corresponding seal;
  processing, by the second software environment, the data;
  sending, by the second software environment, a result of the processed data to the base environment with an indication to return the data to a software environment that originally sent the data;
  determining, by the base environment, that the first software environment is the software environment that originally sent the result;
  applying, by the base environment, a second wrapper to the result, the second wrapper identifying the first software environment, the second wrapper comprising a second seal that may be checked against the result to determine whether the result has been altered since the second seal was determined;
  sending, by the base environment, the result and the second wrapper to the first software environment; and
  verifying, by the first software environment, that the result has not been modified using the result and the second seal.

14. The method of claim 13, wherein the resistance to tampering comprises a resistance to a change in said data.

15. The method of claim 14, wherein said data is to be displayed on a visual display device, and wherein the resistance to tampering comprises displaying a representation of said data in a location on said visual display device and superseding any image other than said representation that is rendered at said location.

16. The method of claim 13, further comprising:
  directing, by said first software object a component responsible for visual output to display a representation of the data to be displayed on a visual display device, said representation comprising one or more indecipherable graphics.

17. The method of claim 16, wherein said representation are either: the same size as each other, or of sizes that are unrelated to a content of said data.

18. The method of claim 16, further comprising:
  directing, by said first software object or said second software object, or a combination of said first software object and said second software object, a component responsible for visual output to display items displayed on said visual display device to be changed in at least one respect to permit viewing of an image of the data produced by said second software object.

19. The method of claim 14, wherein said data is provided using a keyboard, and wherein the resistance to tampering comprises resisting a change to the data in transit from the keyboard to an input stream of the second software object.

20. The method of claim 13, wherein said assurance policy specifies that said data is to be handled by said second software object.

21. The method of claim 13, wherein said data includes, or is associated with, a first label that identifies said second environment as a location in which said data is to be processed.

22. The method of claim 21, wherein said data includes, or is associated with, a second label that identifies said second software object as a processor for said data, and wherein said second environment routes said data to said second software object based on said second label.

23. The method of claim 13, wherein said second environment is associated with a first specification that describes a behavior of said second environment, and wherein said assurance policy provides that said second environment will conform to said first specification.

24. The method of claim 13, wherein said first environment is associated with a second specification that describes a behavior of said first environment, and wherein said first environment provides a second level of assurance that actions performed in the first environment will be performed correctly, said second level of assurance being relatively lower than said first level of assurance.

25. A computer-readable storage medium having stored thereon code and data to allow a user to operate on first and second types of data, said second type of data requiring a relatively higher level of protection from tampering than said first type of data, said code and data comprising:

determining, by a first software object of a first software environment, that the data should be processed securely;

sending, by the first software object, the data to a base environment with an indication to process the data securely;

determining, by the base environment, a second software object with which to process the data securely, the second software object corresponding to the first software object;

applying, by the base environment, a wrapper to the data, the wrapper identifying a second software environment of the second software object, the wrapper comprising a seal that may be checked against the data to determine whether the data has been altered since the seal was determined;

sending, by the base environment, the data and the corresponding wrapper to the second software environment;

verifying, by the second software environment, that the data has not been modified using the data and the corresponding seal;

processing, by the second software environment, the data;

sending, by the second software environment, a result of the processed data to the base environment with an indication to return the data to a software environment that originally sent the data;

determining, by the base environment, that the first software environment is the software environment that originally sent the result;

applying, by the base environment, a second wrapper to the result, the second wrapper identifying the first software environment, the second wrapper comprising a second seal that may be checked against the result to determine whether the result has been altered since the second seal was determined;

sending, by the base environment, the result and the second wrapper to the first software environment;

verifying, by the first software environment, that the result has not been modified using the result and the second seal;

determining, by the first software environment, that the second software environment has a corresponding level of trust sufficient for the first software environment to trust the result; and     using the result to execute the first software object.

26. The method of claim 13, further comprising:

determining, by the first software environment, that the second software environment has a corresponding level of trust sufficient for the first software environment to trust the result; and     using the result to execute the first software object.

\* \* \* \* \*